(12) United States Patent
Yamashita et al.

(10) Patent No.: US 8,851,223 B2
(45) Date of Patent: Oct. 7, 2014

(54) MOTOR MOUNTING STRUCTURE

(75) Inventors: Taichi Yamashita, Toyota (JP); Seiji Sakai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/454,641

(22) Filed: Apr. 24, 2012

(65) Prior Publication Data

US 2012/0292124 A1 Nov. 22, 2012

(30) Foreign Application Priority Data

May 19, 2011 (JP) ................................. 2011-112393

(51) Int. Cl.
*B60K 1/00* (2006.01)
*B62D 21/15* (2006.01)

(52) U.S. Cl.
CPC ............... *B60K 1/00* (2013.01); *B62D 21/155* (2013.01)
USPC ............................ 180/291; 180/299; 180/300

(58) Field of Classification Search
USPC ......... 180/300, 312, 311, 295, 299, 291, 292, 180/232
See application file for complete search history.

(56) References Cited

U.S. PATENT DOCUMENTS

| 5,992,555 | A | * | 11/1999 | Sakamoto et al. | 180/232 |
|---|---|---|---|---|---|
| 7,393,016 | B2 | * | 7/2008 | Mitsui et al. | 180/312 |
| 7,445,076 | B2 | * | 11/2008 | Shigematsu | 180/299 |
| 7,614,473 | B2 | * | 11/2009 | Ono et al. | 180/299 |
| 7,726,429 | B2 | * | 6/2010 | Suzuki | 180/232 |
| 7,874,395 | B2 | * | 1/2011 | Taji et al. | 180/300 |
| 2002/0189873 | A1 | * | 12/2002 | Mizuno | 180/65.3 |
| 2006/0289224 | A1 | * | 12/2006 | Ono et al. | 180/311 |
| 2007/0051549 | A1 | * | 3/2007 | Fukuda | 180/232 |

FOREIGN PATENT DOCUMENTS

| JP | A-7-81429 | 3/1995 |
|---|---|---|
| JP | A-2007-331634 | 12/2007 |
| JP | A-2008-81009 | 4/2008 |

* cited by examiner

*Primary Examiner* — Hau Phan
(74) *Attorney, Agent, or Firm* — Oliff PLC

(57) ABSTRACT

A motor mounting structure including: a left and right pair of side section members disposed at two vehicle width direction sides of a vehicle body with a length direction of the side section members being along a vehicle front-rear direction; a first cross member spanning across a vehicle width direction between the pair of side section members; a second cross member spanning across the vehicle width direction between the pair of side section members, and disposed offset in a vehicle top-bottom direction with respect to the first cross member as viewed from directly in front of the vehicle body; and a coupling member coupling together the first cross member and the second cross member, with an attaching portion of a motor to be mounted to the vehicle body attached to the coupling member.

3 Claims, 8 Drawing Sheets

MOTOR MOUNTING STRUCTURE

CROSS-REFERENCE TO RELATED APPLICATION

This application claims priority under 35 USC 119 from Japanese Patent Application No. 2011-112393, filed May 19, 2011, the disclosure of which is incorporated by reference herein.

BACKGROUND

1. Technical Field

The present invention relates to a motor mounting structure.

2. Related Art

In electric vehicles sometimes the front side portions and rear side portions of the main drive motor are supported through upper portions of brackets provided to the front and rear of a center member (refer for example to Japanese Patent Laid-Open (JP-A) No. 7-81429).

However, as the size of the motor is smaller and height of the rotation center lower than for an internal combustion engine, the input components to the attachment portions of the brackets are substantially vertical components, and there is room for improvement regarding durability strength to input load in such directions.

SUMMARY

In consideration of the above circumstances, the present invention provides a motor mounting structure which is capable of enhancing durability strength with respect to the vertical direction component load input at locations to which the motor is attached.

A motor mounting structure of a first aspect of the present invention includes: a left and right pair of side section members disposed at two vehicle width direction sides of a vehicle body with a length direction of the side section members being along a vehicle front-rear direction; a first cross member spanning across a vehicle width direction between the pair of side section members; a second cross member spanning across the vehicle width direction between the pair of side section members, and disposed offset in a vehicle top-bottom direction with respect to the first cross member as viewed from directly in front of the vehicle body; and a coupling member coupling together the first cross member and the second cross member, with an attaching portion of a motor to be mounted to the vehicle body attached to the coupling member.

According to a motor mounting structure of the first aspect of the present invention, the first cross member and the second cross member span across the vehicle width direction between the pair of side section members, and the second cross member is disposed offset in the vehicle top-bottom direction with respect to the first cross member as viewed from directly in front of the vehicle body. The first cross member and the second cross member are coupled together by the coupling member, and the attaching portion of the motor to be mounted to the vehicle body is attached to the coupling member. Hence, even though load is input to the coupling member from the attaching portion of the motor, for example when running the motor, such load is distributed up and down (to the first cross member side and to the second cross member side). The durability strength of the location to which the motor is attached is consequently enhanced in comparison to cases in which load input from the attaching portion of the motor is not distributed up and down.

The motor mounting structure according to the first aspect of the present invention consequently exhibits the excellent advantageous effect of being able to obtain a motor mounting structure in which the durability strength is raised to the vertical component of input load to the location to which the motor is attached.

In a motor mounting structure of a second aspect of the present invention, the first cross member is disposed in a position in the vehicle front-rear direction to a vehicle front side with respect to the motor; and the coupling member is disposed in a position including the position in the vehicle front-rear direction to the vehicle front side with respect to the motor.

According to the motor mounting structure of the second aspect of the present invention, the first cross member is disposed in a position in the vehicle front-rear direction to the vehicle front side with respect to the motor, and the coupling member is disposed in a position including a position in the vehicle front-rear direction to the vehicle front side with respect to the motor. When a vehicle provided with such a motor mounting structure is involved in a frontal collision, the impact load that occurs is input first to the coupling member positioned further to the vehicle front side than the motor. It is accordingly possible to prevent or suppress direct input of impact load to the motor.

The motor mounting structure according to the second aspect of the present invention consequently exhibits the excellent advantageous effect of being capable of preventing or suppressing direct input of impact load to the motor during a vehicle frontal collision.

A motor mounting structure of a third aspect of the present invention is the second aspect wherein the first cross member is disposed in a position in the vehicle top-bottom direction to a vehicle bottom side with respect to the second cross member; and the coupling member is joined to a top face of the first cross member.

According to a motor mounting structure of the third aspect of the present invention, the first cross member is disposed in a position in the vehicle top-bottom direction to the vehicle bottom side with respect to the second cross member, and the coupling member is joined to the top face of the first cross member. When a vehicle equipped with such a motor mounting structure is involved in a frontal collision, while load acts to attempt to rotate the first cross member about the attachment point of the coupling member and the attaching portion of the motor as viewed from the vehicle side. However, the coupling member suppresses displacement of the first cross member since the load from the first cross member is supported by the second cross member via the coupling member.

The motor mounting structure according to the third aspect of the present invention consequently exhibits the excellent advantageous effect of being capable of suppressing displacement of the first cross member during a vehicle frontal collision.

BRIEF DESCRIPTION OF THE DRAWINGS

Exemplary embodiments of the present invention will be described in detail based on the following figures, wherein.

DETAILED DESCRIPTION

First Exemplary Embodiment

Explanation follows regarding a motor mounting structure according to a first exemplary embodiment of the present invention, with reference to FIG. 1 to FIG. 4A and FIG. 4B. In the drawings the arrow FR indicates the vehicle front side, the arrow UP indicates the vehicle top side and the arrow W indicates the vehicle width direction as appropriate.

Figure 1:
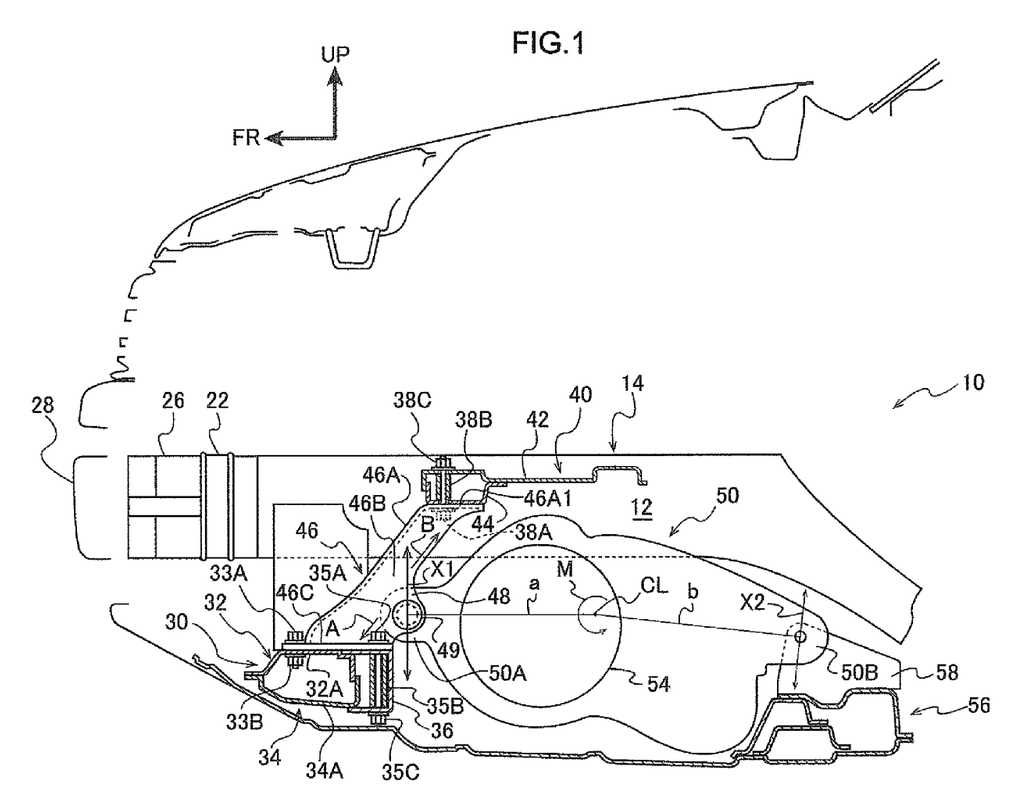
FIG. 1 is a side-view cross-section illustrating the front section of a vehicle to which a motor mounting structure according to a first exemplary embodiment of the present invention has been applied, and corresponding to a cross-section sectioned along the line 1-1 of FIG. 2.
Figure 2:
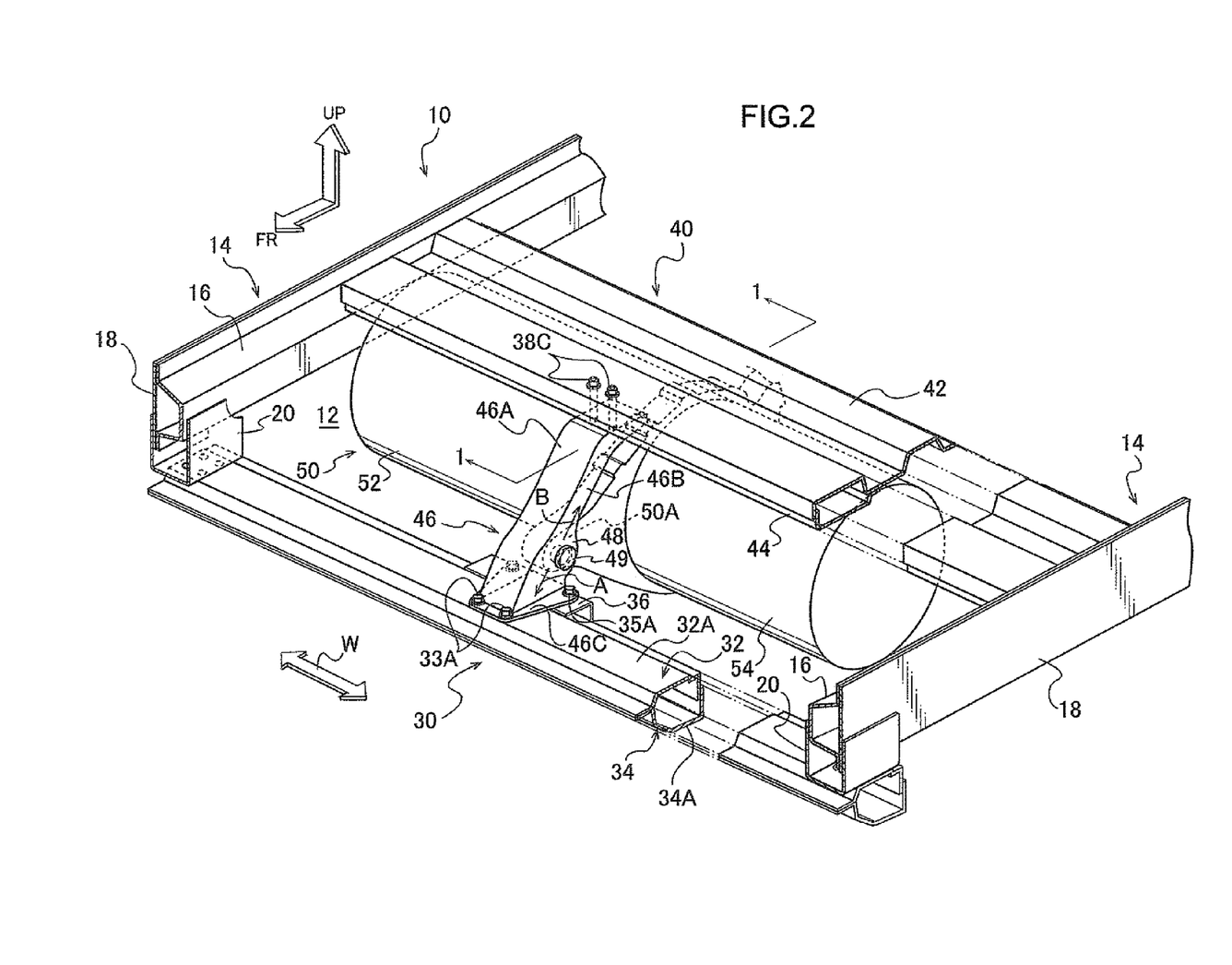
FIG. 2 is a perspective view illustrating a motor mounting structure according to a first exemplary embodiment of the present invention, shown with a portion of a front cross member and a motor compartment cross member cut-away.

FIG. 1 illustrates a side-view cross-section of a vehicle front section to which a motor mounting structure according to the present exemplary embodiment has been applied. FIG. 1 illustrates the vehicle front section in side-view as sectioned at about a central portion in the vehicle width direction. FIG. 2 is a perspective view of a motor mounting structure, and FIG. 3 is a schematic plan view of a motor mounting structure.

At a front section of a vehicle body 10, as shown in the drawings, a housing space 12 is formed for housing components such as a motor unit 50, described later, and front side members 14 serving as a left-right pair of side members are disposed at the two vehicle width direction sides with the length directions of the front side members 14 along the vehicle front-rear direction. The front side members 14 are vehicle frame members, and as shown in FIG. 2, include inner front side members 16 configuring the vehicle width direction insides of the front side members 14 and outer front side members 18 configuring the vehicle width direction outsides thereof. The inner front side members 16 are formed with a hat shaped cross-section profile opening towards the vehicle width direction outside. The outer front side members 18 are formed in long flat plate shapes that close off the open portions of the inner front side members 16. The front side members 14 are accordingly configured with a closed cross-sectional structure by joining together the inner front side members 16 and the outer front side members 18 by welding.

Figure 3:
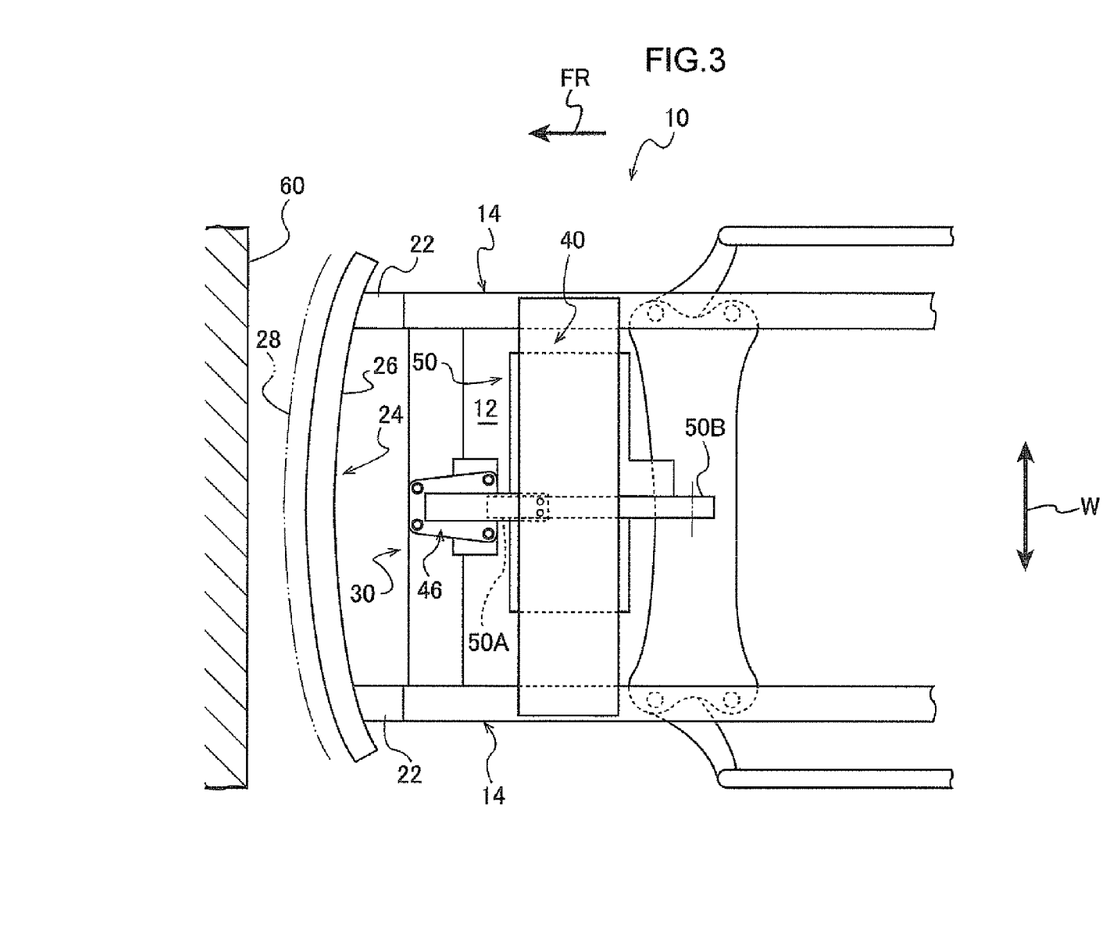
FIG. 3 is a schematic plan view illustrating the front section of a vehicle to which a motor mounting structure according to the first exemplary embodiment of the present invention has been applied.

As shown in FIG. 3, a crash box 22 formed with a rectangular tube shape is connected coaxially to front end portions of each of the front side members 14. The crash boxes 22 are configured to perform compressive plastic deformation when imparted with axial direction load so as to absorb energy. A front bumper reinforcement 26 is joined to front end portions of the left and right crash boxes 22. The front bumper reinforcement 26 is disposed at a vehicle front end position with the length direction of the front bumper reinforcement 26 substantially along the vehicle width direction. The front bumper reinforcement 26 is formed with a curved profile and in plan view a central portion of the front bumper reinforcement 26 bows out further to the vehicle front side at than the two side portions. The front bumper reinforcement 26 is a member configuring a vehicle frame member of a front bumper 24 and is formed with a closed cross-section structure. The front bumper 24 includes the front bumper reinforcement 26 and a front bumper cover 28 configured with a design face.

A front cross member 30 serving as a first cross member spans across the vehicle width direction between front end portions of the pair of front side members 14, with brackets 20 therebetween (see FIG. 2). As shown in FIG. 2, the brackets 20 are configured as bent plate shapes opening towards the vehicle top side, and the brackets 20 are joined to side wall portions of the front side members 14, such as by welding, so as to project out to the vehicle bottom side with respect to the front end portions of the front side members 14. Length direction end portions of the front cross member 30 are joined by bolt fasteners to the bottom faces of bottom wall portions of the brackets 20.

The front cross member 30 is disposed in the vehicle front-rear direction at the vehicle front side with respect to the motor unit 50. The front cross member 30 includes an upper front cross member 32 configuring the upper side of the front cross member 30 and a lower front cross member 34 configuring the lower side thereof. The upper front cross member 32 is open towards the vehicle bottom side and a flange portion is formed at the front bottom edge of the upper front cross member 32 so as to bend out towards the vehicle front side. The lower front cross member 34 is open towards the vehicle top side and a flange portion is formed at the front top edge of the lower front cross member 34 so as to bend out towards the vehicle front side. The upper front cross member 32 and the lower front cross member 34 are joined together by welding together the opening face side edge portions at the front side flange portions and the rear wall portions of the upper front cross member 32 and the lower front cross member 34. The front cross member 30 is accordingly configured with a closed cross-section structure.

As shown in FIG. 3, a motor compartment cross member 40 serving as a second cross member spans across the vehicle width direction between length direction intermediate portions of the pair of front side members 14. The motor compartment cross member 40 is disposed to the vehicle rear side with respect to the front cross member 30 and the motor compartment cross member 40 is offset to the vehicle top side with respect to the front cross member 30 when viewed from directly in front of the vehicle (in other words disposed at a position in the vehicle front-rear direction to the vehicle rear side with respect to the front cross member 30 and at a position in the vehicle top-bottom direction to the vehicle top side with respect to the front cross member 30) (see FIG. 2).

As shown in FIG. 2, the motor compartment cross member 40 includes an upper motor compartment cross member 42 configuring the upper side of the motor compartment cross member 40 and a lower motor compartment cross member 44 configuring the lower side thereof. The upper motor compartment cross member 42 is formed with a rectangular corrugated cross-section profile, with the front edge of the upper motor compartment cross member 42 bending towards the vehicle bottom side. The lower motor compartment cross member 44 is open towards the vehicle top side and a flange portion is formed at the rear top edge of the lower motor compartment cross member 44 so as to bend towards the vehicle rear side. The front top edge and the rear flange portion of the lower motor compartment cross member 44 are joined by welding to front portions of the upper motor compartment cross member 42. A front section of the motor compartment cross member 40 is accordingly configured with a closed cross-section structure.

A length direction intermediate portion of the front cross member 30 and a length direction intermediate portion of the motor compartment cross member 40 are coupled together in the vehicle top-bottom direction when viewed from directly in front of the vehicle by a brace 46 (also referred to as a "bracket") serving as a coupling member. The brace 46 is an elongated plate shaped member made of metal (made from steel in the present exemplary embodiment) disposed so as to slope overall slightly towards the vehicle rear side on progression towards the vehicle top side. The brace 46 is disposed at a position in the vehicle front-rear direction including a position to the vehicle front side with respect to the motor unit 50.

The brace 46 includes: an elongated portion 46A; a pair of side wall portions 46B at the two width direction (a direction orthogonal to the length direction) edges of the elongated portion 46A, the side wall portions 46B bending around substantially at right angles and facing each other; and a flange portion 46C that bends around from each of the bottom edges of the elongated portion 46A and the side wall portions 46B so as to form a substantially U-shaped profile in plan view. The brace 46 is formed with a profile of the elongated portion 46A and the side wall portions 46B that is open towards the vehicle rear-bottom side. The flange portion 46C at the bottom end side of the brace 46 is joined by bolt fasteners to the top face of a top wall portion 32A of the upper front cross member 32. Namely bolts 33A pass through the flange portion 46C of the brace 46, and through the top wall portion 32A of the upper front cross member 32, and nuts 33B (see FIG. 1) are screwed onto male threaded portions of the bolts 33A that protrude out to the bottom side of the top wall portion 32A of the upper front cross member 32.

A length direction intermediate portion of the front cross member 30 is reinforced by a reinforcement member 36 at locations corresponding to where the brace 46 is attached. As shown in FIG. 1, the reinforcement member 36 is formed in a bent plate shape open towards the vehicle front side, and a top wall portion of the reinforcement member 36 is joined by welding to the top face of the top wall portion 32A of the upper front cross member 32, and a bottom wall of the reinforcement member 36 is joined by welding to the bottom face of a bottom wall portion 34A of the lower front cross member 34. The reinforcement member 36 and the front cross member 30 accordingly form a closed cross-section structure.

A portion of the flange portion 46C of the brace 46 is mounted to a top wall portion of the reinforcement member 36 and joined thereto with bolt fasteners. More specifically, bolts 35A pass through the flange portion 46C of the brace 46 and the top wall portion of the reinforcement member 36, through circular cylindrical shape collars 35B, and through a bottom wall portion of the reinforcement member 36. Nuts 35C are screwed onto male threaded portions of the bolts 35A that protrude out from the reinforcement member 36. The collars 35B disposed inside the closed cross-section formed by the front cross member 30 and the reinforcement member 36 are disposed with axial directions along the vehicle top-bottom direction. Unthreaded through holes are formed through axial center portions of the collars 35B. A configuration is accordingly achieved in which the collars 35B suppress the closed cross-section portion configured by the front cross member 30 and the reinforcement member 36 from deforming (referred to as cross-sectional collapse) even when load is input from the brace 46.

A top end portion 46A1 of the elongated portion 46A of the brace 46 bends out towards the vehicle rear side and is disposed substantially horizontally, joined with bolt fasteners to the bottom face of the lower motor compartment cross member 44. More specifically, bolts 38A pass through the brace 46, the lower motor compartment cross member 44, the circular cylinder shaped columns 3813 and the upper motor compartment cross member 42. Nuts 38C are screwed onto male threaded portions of the bolts 38A that protrude out from the upper motor compartment cross member 42. The columns 3813 disposed in the closed cross-section configured by the upper motor compartment cross member 42 and the lower motor compartment cross member 44 are disposed with axial directions along the vehicle top-bottom direction. Unthreaded through holes are formed through axial center portions of the columns 38B. A configuration is accordingly achieved in which the columns 38B suppress the front portion of the motor compartment cross member 40 from deforming (referred to as cross-sectional collapse) even when load is input from the brace 46.

In the present exemplary embodiment the rigidity to load from the brace 46 is higher at the portion configured by the front cross member 30 and the reinforcement member 36 and attached bottom end portion of the brace 46 than at the front portion of the motor compartment cross member 40 attached to the top end portion of the brace 46.

An attachment portion 48 (motor mount insertion portion) is formed at a location towards the bottom end of the brace 46 (at the front cross member 30 and reinforcement member 36 side). A front attaching portion 50A serving as an attaching portion of the motor unit 50 to be mounted to the vehicle body 10 is attached to the attachment portion 48. The attachment portion 48 is formed with bolt insertion through holes at portion of the side wall portions 46B of the brace 46.

As shown in FIG. 2, the motor unit 50 is configured including a motor 52 and an inverter 54. The rotation axis direction of the motor 52 is set along the vehicle width direction, and as shown in FIG. 1, the front attaching portion 50A is formed to the front end side of the motor 52 and a rear attaching portion 50B is formed at the rear end side of the motor 52. As shown in FIG. 2, the front attaching portion 50A of the motor unit 50 is disposed to the attachment portion 48 of the brace 46 between the pair of side wall portions 46B, and is fastened to the side wall portions 46B with a bolt 49 and nut (not shown in the drawings) pair. As shown in FIG. 1, the rear attaching portion 50B of the motor unit 50 is bolt fastened through a bracket 58 to a vehicle frame member 56 disposed with its length direction along the vehicle width direction. The vehicle frame member 56 is a member configured by plural plate shaped members and disposed with the length direction of the vehicle frame member 56 along the vehicle width direction.

<Operation and Advantageous Effects>

Explanation follows regarding the operation and advantageous effects of the above exemplary embodiment.

In the motor mounting structure according to the present exemplary embodiment, the front cross member 30 and the motor compartment cross member 40 illustrated in FIG. 2 span across in the vehicle width direction between the pair of front side members 14, and are coupled by the brace 46 in the vehicle top-bottom direction as viewed from directly in front of the vehicle. The front attaching portion 50A of the motor unit 50 to be mounted to the vehicle body 10 is attached to the attachment portion 48 of the brace 46. Hence, even though load is input to the attachment portion 48, for example when running the motor 52, such load is distributed up and down (namely to the front cross member 30 side and to the motor compartment cross member 40 side). The directions of load transmission are illustrated in the drawings by the arrow A direction and the arrow B direction. The durability strength of the brace 46 including the attachment portion 48 is enhanced by distributing the load in this manner, in comparison to cases in which load input to the attachment portion 48 is not distributed up and down.

Further explanation follows regarding the direction of input load acting on the attachment portion 48. Generally the motor 52 of the motor unit 50 is smaller in size than that of an internal combustion engine (not shown in the drawings), and the height position of the unit rotation center CL with respect to the front attaching portion 50A and the rear attaching portion 50B illustrated in FIG. 1 is lower than for cases with an engine. The mounting input components of a rotation moment M hence has a larger component in a vertical direction than for cases with an engine, with the mounting input components being substantially vertical components. Namely directions (see the arrow X1, X2 directions in the drawings) orthogonal to lines a, b connecting together each of the centers of attachment of the front attaching portion 50A and the rear attaching portion 50B to the unit rotation center CL are substantially along the top-bottom direction. Top-bottom direction load distribution of the load input from the front attaching portion 50A and the rear attaching portion 50B therefore becomes important. In the present exemplary embodiment a structure with an advantageous load distribution is achieved since, as explained above, load input to the attachment portion 48 can be transmitted up and down (see the arrow A direction and the arrow B direction).

Note that the motor unit generally generates high torque in an electrical vehicle, and force input to mountings is larger than for engine vehicles. In order to give satisfactory durability strength to input force to mountings using a conventional body structure, not only the need for local reinforcement, but also the need for other wide-ranging significant changes are considered. However, with the motor mounting structure according to the present exemplary embodiment, load can be distributed to two locations at the vicinity of the point of input (in two directions), and so durability strength can be satisfied without undertaking major changes to a conventional body structure. In other words the durability strength can be greatly increased while suppressing any increase in mass required for reinforcement.

In the present exemplary embodiment, the strength of the structural section illustrated in FIG. 2 configured by the front cross member 30, the brackets 20, the front side members 14 and the motor compartment cross member 40 is efficiently raised by attaching the brace 46. Deformation of the structural section is accordingly suppressed even when load is input to the attachment portion 48. Hence, for example, displacement of the front cross member 30 is suppressed even under the action of load attempting to rotate the front cross member 30 about the attachment point of the attachment portion 48 in vehicle side view, and the front cross member 30 can be prevented or suppressed from making contact with the motor 52 and the inverter 54.

Figure 4A:
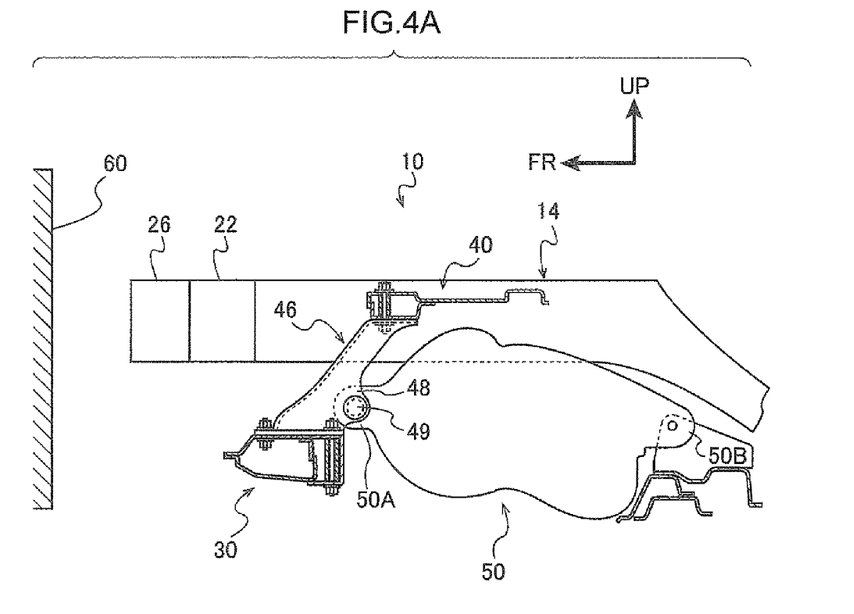
FIG. 4A is a schematic side-view cross-section to explain the operation of a motor mounting structure according to the first exemplary embodiment of the present invention during a frontal collision of a vehicle to which the motor mounting structure has been applied, illustrating a state prior to impact.
Figure 4B:
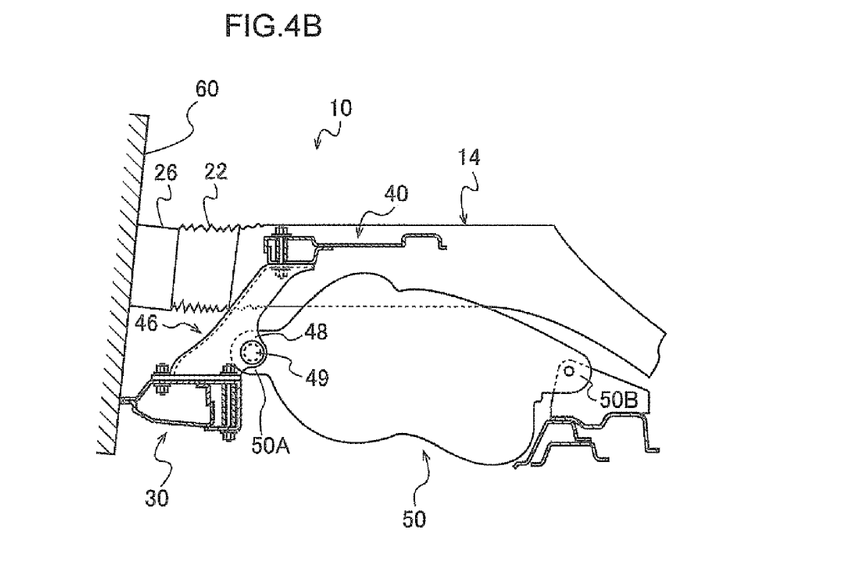
FIG. 4B is a schematic side-view cross-section to explain the operation of a motor mounting structure according to the first exemplary embodiment of the present invention during a frontal collision of a vehicle to which the motor mounting structure has been applied, illustrating a state post impact.

When a vehicle provided with the motor mounting structure according to the present exemplary embodiment is involved in a frontal collision with a barrier (collision body) 60 as illustrated in FIG. 4A, the impact load that occurs is input from the front bumper reinforcement 26 to the crash boxes 22, as shown in FIG. 4B. The crash boxes 22 accordingly absorb energy by compressing along the axial direction and undergoing plastic deformation. However, in the process the barrier 60 presses the front cross member 30 towards the vehicle rear side. In the present exemplary embodiment the front cross member 30 is disposed in a position in the vehicle front-rear direction at the vehicle front side with respect to the motor unit 50, and the brace 46 is disposed at a position in the vehicle front-rear direction including a position at the vehicle front side with respect to the motor unit 50. The impact load is accordingly first input to the brace 46 positioned further to the vehicle front side than the motor unit 50. The impact load can accordingly be prevented or suppressed from being directly input to the motor unit 50.

When this occurs, contact between the barrier 60 and the motor unit 50 can be suppressed due to the brace 46 pressing the motor unit 50 towards the vehicle rear side. Damage to the motor 52 and the inverter 54 illustrated in FIG. 2 is accordingly prevented.

As shown in FIG. 4A, the front cross member 30 is also disposed in a position in the vehicle top-bottom direction to the vehicle bottom side with respect to the motor compartment cross member 40, and the brace 46 is joined to the top face of the front cross member 30. Hence when a vehicle equipped with the motor mounting structure according to the present exemplary embodiment is involved in a frontal collision, as shown in FIG. 4B, while load acts attempting to rotate the front cross member 30 about the attachment point of the attachment portion 48 as viewed from the vehicle side. However, the brace 46 suppresses displacement of the front cross member 30, since the load from the front cross member 30 is supported by the motor compartment cross member 40 via the brace 46.

As explained above, according to the motor mounting structure of the present exemplary embodiment, the durability strength to the vertical component of input load to the attachment portion 48 can be raised.

Second Exemplary Embodiment

Figure 5:
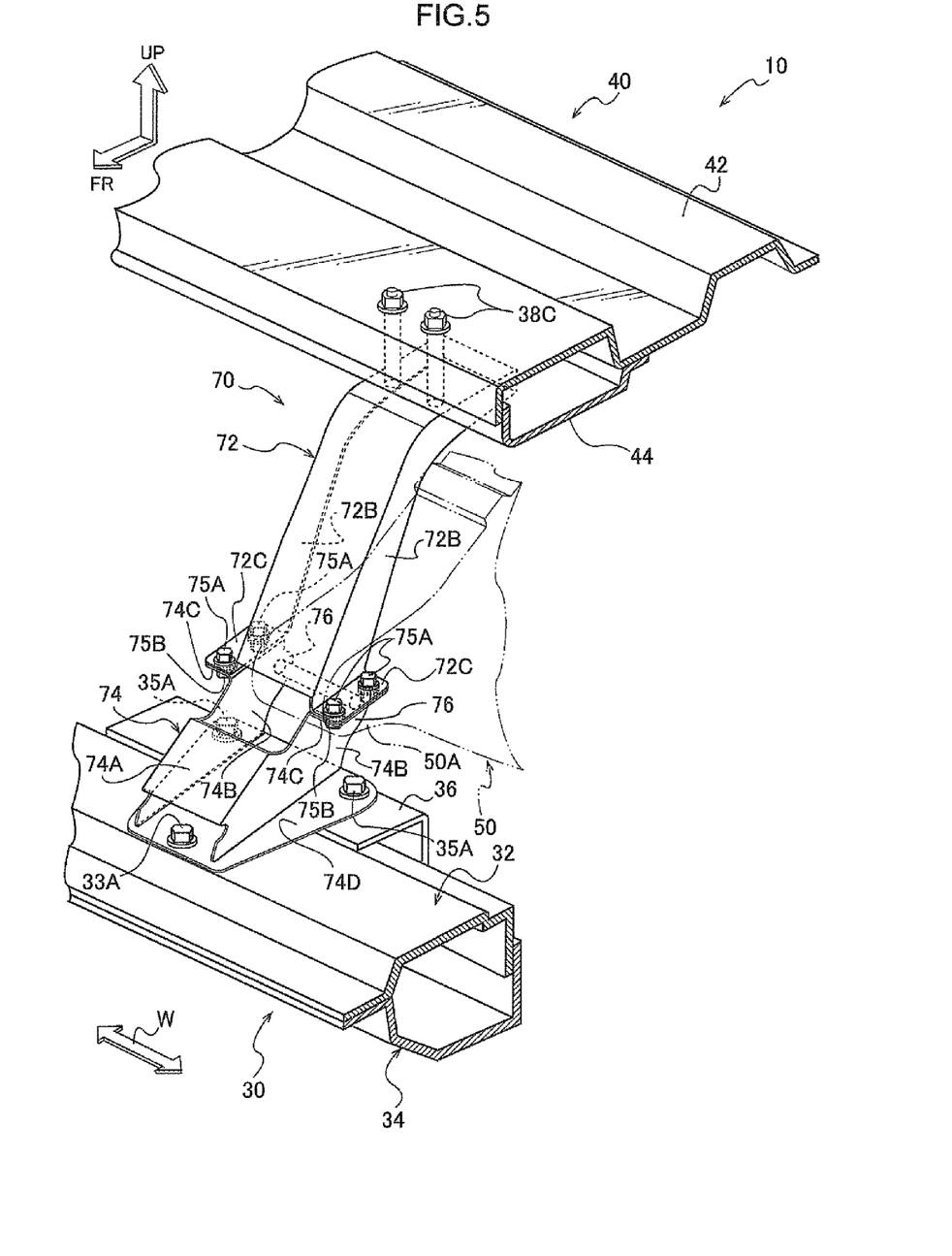
FIG. 5 is a perspective view illustrating components such as a brace configuring a motor mounting structure according to a second exemplary embodiment of the present invention.

As a second exemplary embodiment of the present invention, configuration may be made in which a brace 70 serving as a coupling member as illustrated in FIG. 5 is disposed in place of the brace 46 illustrated in FIG. 2. The brace 70 includes a brace main body 72 and a mounting bracket 74 disposed at the bottom side of the brace main body 72 and joined to the brace main body 72. The top portion of the brace main body 72 is formed similarly to the top portion of the brace 46 of the first exemplary embodiment (see FIG. 2), and a motor compartment cross member 40 is joined to the brace 46 with a similar structure to that of the first exemplary embodiment.

A flange portion 72C is formed at a bottom end portion of the brace main body 72 so as to extend out in opposite directions (towards the vehicle width direction outsides) from bottom edges of a pair of side wall portions 72B. The flange portion 72C of the brace main body 72 overlaps with and is joined by bolt fasteners to an upper end flange portion 74C of the mounting bracket 74. Namely, bolts 75A pass through the flange portion 72C of the brace main body 72 and the upper end flange portion 74C of the mounting bracket 74. Nuts 75B are then screwed onto male threaded portions of the bolts 75A that project out to the bottom side of the upper end flange portion 74C of the mounting bracket 74.

In the mounting bracket 74, side wall portions 74B that bend around from the base edge side of the upper end flange portion 74C towards the vehicle bottom side are disposed as extension portions of the side wall portions 72B of the brace main body 72. Front upper portions of the left and right pair of side wall portions 74B are coupled together by a sloping walled portion 74A. The sloping walled portion 74A slopes towards the vehicle front side on progression towards the vehicle bottom side.

The bottom edges of the left and right pair of side wall portions 74B are coupled together by a bottom wall portion 74D, and plural bolt insertion through holes are formed through the bottom wall portion 74D. The bottom wall portion 74D of the mounting bracket 74 is disposed above the upper front cross member 32 and the reinforcement member 36 and bolt fastened thereto.

The brace 70 couples the front cross member 30 and the motor compartment cross member 40 together along the vehicle up-down direction as viewed from directly in front of the vehicle, and an attachment portion 76 is formed to the rear edge upper portion of the mounting bracket 74. A front attaching portion 50A of the motor unit 50 to be mounted to the vehicle body 10 is attached to the attachment portion 76. The attachment portion 76 configures a portion of the side wall portions 74B of the mounting bracket 74 and is formed with a bolt through hole. The attachment portion 76 sandwiches the front attaching portion 50A of the motor unit 50 from the outside in both vehicle width directions and is fastened with a bolt to the front attaching portion 50A in this state.

Similar operation and advantageous effects are achieved according to the second exemplary embodiment to those of the first exemplary embodiment.

Third Exemplary Embodiment

Figure 6:
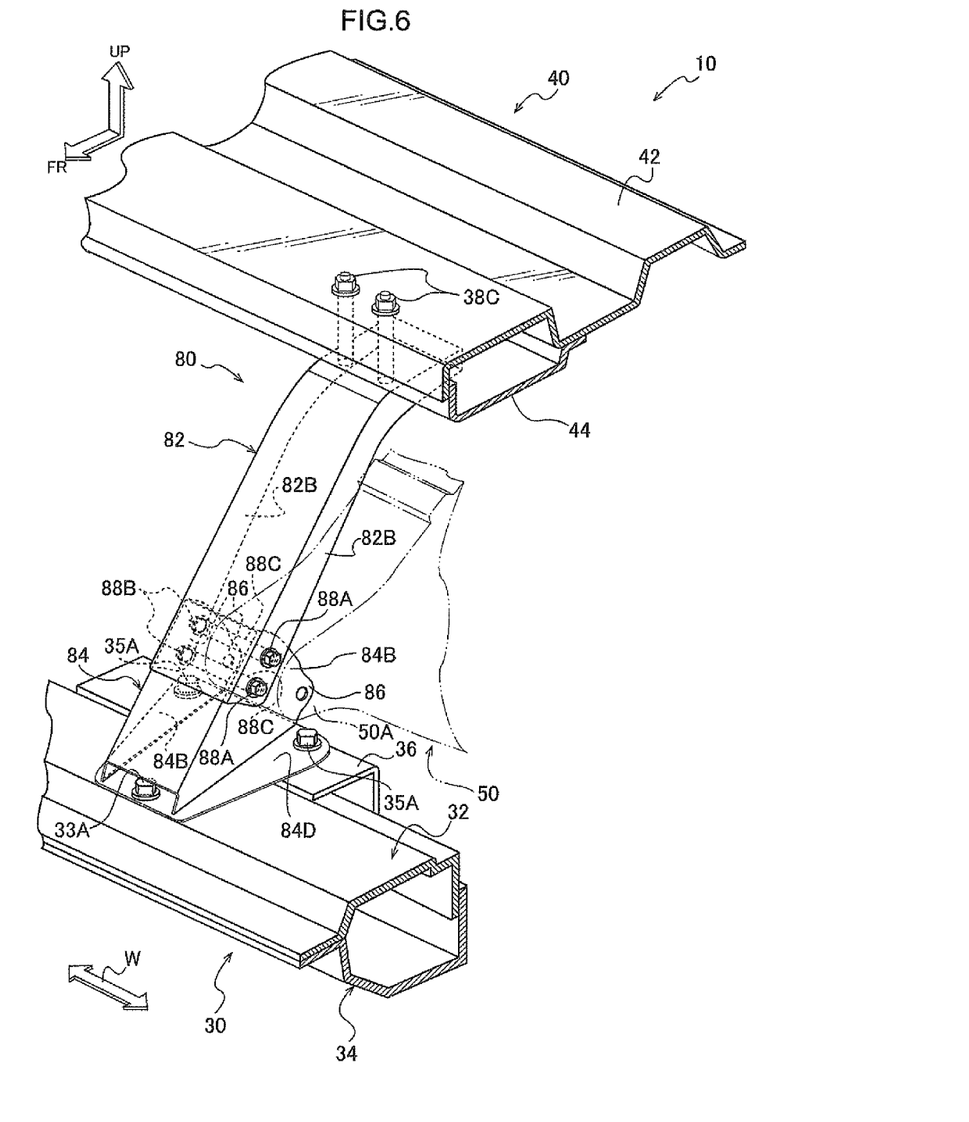
FIG. 6 is a perspective view illustrating components such as a brace configuring a motor mounting structure according to a third exemplary embodiment of the present invention.

As a third exemplary embodiment of the present invention configuration may be made with a brace 80 illustrated in FIG. 6 serving as a coupling member in place of the brace 46 illustrated in FIG. 2. The brace 80 includes a brace main body 82 and a mounting bracket 84 disposed at the bottom side of the brace main body 82 and joined to the brace main body 82. The top portion of the brace main body 82 is formed similarly to the top portion of the brace 46 of the first exemplary embodiment (see FIG. 2), and a motor compartment cross member 40 is joined to the brace 80 with a similar structure to that of the first exemplary embodiment.

The bottom portion of the brace main body 82 and the top portion of the mounting bracket 84 are formed with open cross-section profiles opening towards the vehicle rear side, and the top portion of the mounting bracket 84 is disposed inside and overlapping with the open cross-section of the bottom portion of the brace main body 82. The bottom portion of a pair of side wall portions 82B on the brace main body 82 are fastened with bolts so as to sandwich the top portion of a pair of side wall portions 84B of the mounting bracket 84 from the vehicle width direction outside. Note that bolts 88A pass through the pair of side wall portions 82B of the brace main body 82 and the pair of side wall portions 84B of the mounting bracket 84 and are screwed into nuts 88B. The bolts 88A pass through circular cylinder shaped collars 88C disposed between the pair of side wall portions 84B of the mounting bracket 84.

The bottom ends of the left and right pair of side wall portions 84B are coupled together by a bottom wall portion 84D, and the bottom wall portion 84D is formed with plural bolt through holes. Namely the bottom wall portion 84D of the mounting bracket 84 is disposed over the upper front cross member 32 and the reinforcement member 36 and fastened by bolts thereto.

The brace 80 couples the front cross member 30 and the motor compartment cross member 40 together along the vehicle top-bottom direction as viewed from directly in front of the vehicle, and an attachment portion 86 is formed jutting out from the mounting bracket 84 to the vehicle rear side. A front attaching portion 50A of a motor unit 50 for mounting to the vehicle body 10 is attached to the attachment portion 86. The attachment portion 86 is configured by portions of the side wall portions 84B of the mounting bracket 84, and is fastened by a bolt in a state in which the side wall portions 84B sandwich the front attaching portion 50A of the motor unit 50 from the two width direction outsides.

Similar operation and advantageous effects are achieved according to the third exemplary embodiment to those of the first exemplary embodiment.

Fourth Exemplary Embodiment

Figure 7:
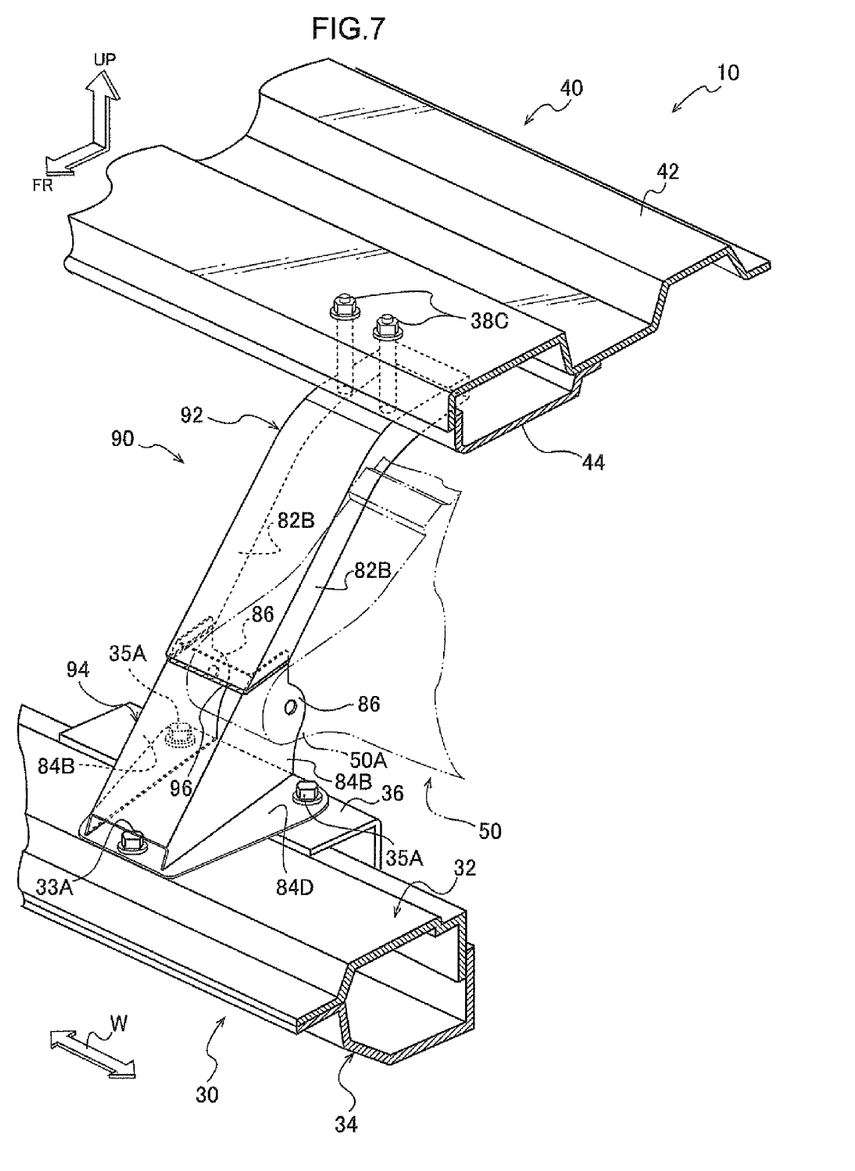
FIG. 7 is a perspective view illustrating components such as a brace configuring a motor mounting structure according to a fourth exemplary embodiment of the present invention.

As a fourth exemplary embodiment of the present invention a brace 90 serving as a coupling member as illustrated in FIG. 7 may be disposed in place of the brace 46 illustrated in FIG. 2. The brace 90 includes a brace main body 92 and a mounting bracket 94 disposed at the bottom side of the brace main body 92 and joined to the brace main body 92. The top portion of the brace main body 92 is formed similarly to the top portion of the brace 46 of the first exemplary embodiment (see FIG. 2), and a motor compartment cross member 40 is joined to the brace 90 with a similar structure to that of the first exemplary embodiment.

The brace main body 92 is configured essentially similarly to the brace main body 82 of the third exemplary embodiment illustrated in FIG. 6, except in the respects explained below. The mounting bracket 94 illustrated in FIG. 7 is configured essentially similarly to the mounting bracket 84 of the third exemplary embodiment illustrated in FIG. 6, except in the respects explained below. The same reference numerals are hence appended to similar configuration elements and further explanation is omitted.

As shown in FIG. 7, the bottom end portion of the brace main body 92 and the top end portion of the mounting bracket 94 are overlapped with each other by a given amount along their open cross-section profiles. The overlapping portions of the brace main body 92 and the mounting bracket 94 are then joined together by arc welding. The arc welding portion is indicted by the reference numeral 96 in the drawings.

Similar operation and advantageous effects are achieved according to the fourth exemplary embodiment to those of the first exemplary embodiment.

Fifth Exemplary Embodiment

Figure 8:
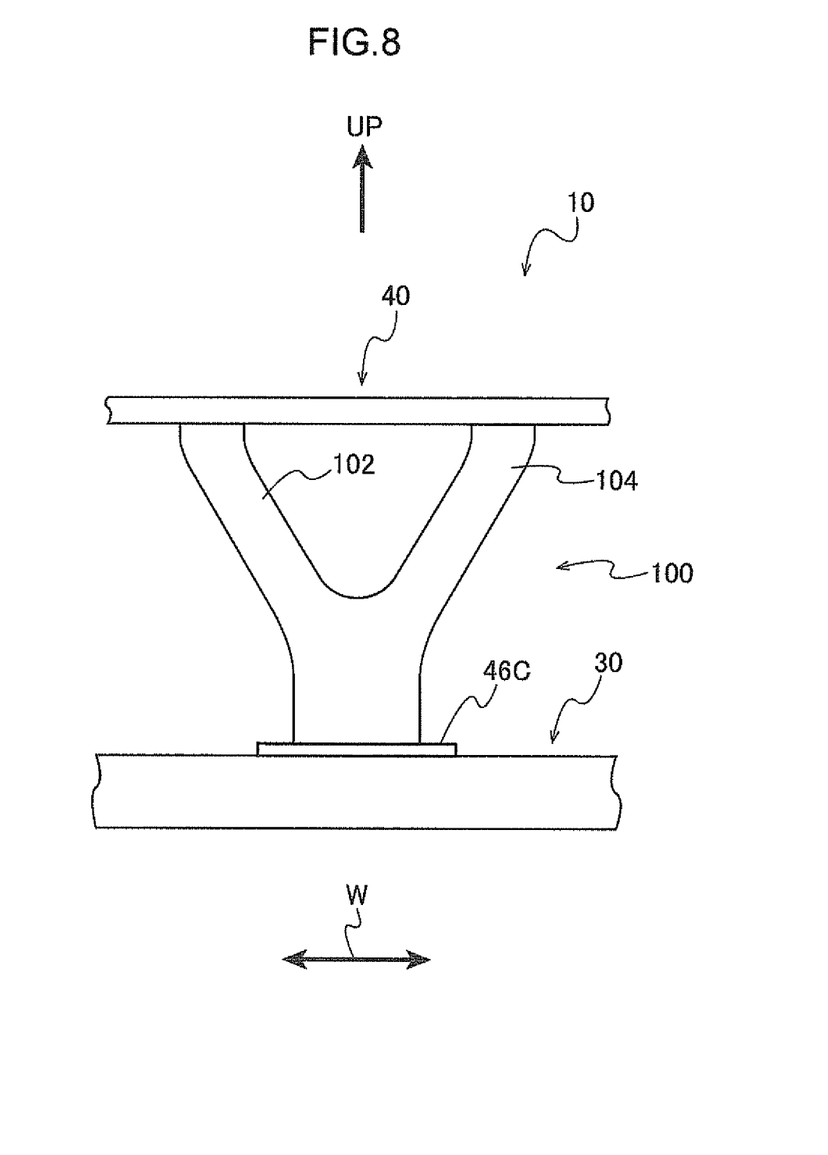
FIG. 8 is a frontal view schematically illustrating a motor mounting structure according to a fifth exemplary embodiment of the present invention.

As a fifth exemplary embodiment of the present invention a brace 100 serving as a coupling member and schematically illustrated face-on in FIG. 8 may be disposed in place of the brace 46 illustrated in FIG. 2. The brace 100 illustrated in FIG. 8 is formed with a Y-shaped profile when viewed from directly in front of the vehicle, forking into two from an up-down direction intermediate portion, and configured including a first coupling portion 102 and a second coupling portion 104 that are each joined to the motor compartment cross member 40. Other aspects of the brace 100 are configured similarly to in the brace 46 of the first exemplary embodiment (see FIG. 2). The brace 100 couples the front cross member 30 and the motor compartment cross member 40 together in the vehicle up-down direction as viewed from directly in front of the vehicle, and an attachment portion (not shown in the drawings) is provided to the brace 100, for attaching an attaching portion of a motor to be mounted to the vehicle body 10. The same reference numerals are appended in FIG. 8 to configuration elements similar to those of the first exemplary embodiment. The thus configured fifth exemplary embodiment also achieves similar operation and advantageous effects to those of the first exemplary embodiment.

<Additional Explanation of Exemplary Embodiments>

In the above exemplary embodiments, as shown in FIG. 2, the motor compartment cross member 40 is disposed to the vehicle rear side with respect to the front cross member 30, and offset with respect to the front cross member 30 to the vehicle top side as viewed from directly in front of the vehicle, however configuration may be made with the second cross member disposed to the vehicle rear side with respect to the first cross member and offset with respect to the first cross member to the vehicle bottom side as viewed from directly in front of the vehicle.

The "coupling member" referred to in claims may be a coupling member configured by a single member such as the braces 46, 100 in the first and the fifth exemplary embodiments, or may be a coupling member configured from plural members, such as the braces 70, 80, 90 in the second to the fourth exemplary embodiments.

In the above exemplary embodiments the braces 46, 70, 80, 90, 100 serving as the coupling member are disposed at positions in the vehicle front-rear direction including a position that is to the vehicle front side with respect to the motor unit 50 (52), and such a configuration is preferable from the perspective of preventing or suppressing direct input of impact load to the motor during a vehicle frontal collision. However, configuration may be made with a coupling member disposed at a position in the vehicle front-rear direction including a position to the vehicle rear side with respect to the motor.

Furthermore, in the above exemplary embodiments the braces 46, 70, 80, 90, 100 are joined to the top face of the front cross member 30, and such a configuration is preferable from the perspective of suppressing displacement of the front cross member 30 during a vehicle frontal collision. However, configuration may be made with a brace (coupling member) joined to another face of the front cross member 30 (the first cross member), such as the rear face (the face on the vehicle rear side).

In the above exemplary embodiments the braces 46, 70, 80, 90, 100 are joined to the front cross member 30 and the motor compartment cross member 40 by fastening with bolts. However, configuration may be made with a coupling member that is joined to the first cross member and/or the second cross member by another method, such as welding.

In the above exemplary embodiments the braces 46, 70, 80, 90, 100 are made from steel, however the coupling member may be a coupling member formed from another material, such as one made from an aluminum alloy or from carbon.

The above exemplary embodiments and the plural examples of modifications given above may be combined with each other as appropriate.

What is claimed is:

1. A motor mounting structure for use in a vehicle having a left and right pair of front side members disposed at two vehicle width direction sides of a vehicle body with a length direction of the front side members being along a vehicle front-rear direction, a front bumper reinforcement disposed at a vehicle front end position with a length direction of the front bumper reinforcement being substantially along a vehicle width direction, and a crash box disposed between a first one of the front side members and the front bumper reinforcement, the motor mounting structure comprising:
a bracket disposed at a front end portion of a vehicle front side of the first one of the front side members and projecting out to a vehicle bottom side from the front end portion of the first one of the front side members;
a first cross member spanning across the vehicle width direction between the pair of front side members via the bracket;
a second cross member spanning across the vehicle width direction between the pair of front side members, and disposed offset with respect to the first cross member in a vehicle upper side of a vehicle top-bottom direction in a vehicle front view and in a vehicle rear side of the vehicle front-rear direction in a vehicle plan view; and
a coupling member coupling together the first cross member and the second cross member, with an attaching portion of a motor to be mounted to the vehicle body attached to the coupling member.

2. The motor mounting structure of claim 1 wherein:
the first cross member is disposed in a position in the vehicle front-rear direction to a vehicle front side with respect to the motor; and
the coupling member is disposed in a position including the position in the vehicle front-rear direction to the vehicle front side with respect to the motor.

3. The motor mounting structure of claim 2 wherein:
the coupling member is joined to a top face of the first cross member.

* * * * *